(12) United States Patent
Hirakawa et al.

(10) Patent No.: US 11,176,698 B2
(45) Date of Patent: Nov. 16, 2021

(54) ANALYSIS APPARATUS, ANALYSIS METHOD, AND STORAGE MEDIUM

(71) Applicant: NEC Corporation, Tokyo (JP)

(72) Inventors: Yasufumi Hirakawa, Tokyo (JP); Jianquan Liu, Tokyo (JP); Shoji Nishimura, Tokyo (JP); Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/080,745

(22) PCT Filed: Feb. 13, 2017

(86) PCT No.: PCT/JP2017/005100
§ 371 (c)(1),
(2) Date: Aug. 29, 2018

(87) PCT Pub. No.: WO2017/169189
PCT Pub. Date: Oct. 5, 2017

(65) Prior Publication Data
US 2019/0035106 A1    Jan. 31, 2019

(30) Foreign Application Priority Data

Mar. 30, 2016   (JP) .............................. JP2016-067538

(51) Int. Cl.
*G06T 7/70*     (2017.01)
*H04N 7/18*     (2006.01)
(Continued)

(52) U.S. Cl.
CPC ............ *G06T 7/70* (2017.01); *G06K 9/00228* (2013.01); *G06K 9/00744* (2013.01);
(Continued)

(58) Field of Classification Search
None
See application file for complete search history.

(56) References Cited

U.S. PATENT DOCUMENTS 8,457,466 B1   6/2013   Sharma et al.
9,589,181 B2   3/2017   Ito et al.
(Continued)

FOREIGN PATENT DOCUMENTS

CN    101092221 A    12/2007
DE    102017126353 A1    5/2019
(Continued)

OTHER PUBLICATIONS

Japanese Office Action for JP Application No. 2019-033711 dated Nov. 12, 2019 with English Translation.
(Continued)

*Primary Examiner* — Nancy Bitar

(57) ABSTRACT

Provided is an analysis apparatus (10) including a person extraction unit (11) that analyzes video data to extract a person, a time calculation unit (12) that calculates a continuous appearance time period for which the extracted person has been continuously present in a predetermined area and a reappearance time interval until the extracted person reappears in the predetermined area for each extracted person, and an inference unit (13) that infers a characteristic of the extracted person on the basis of the continuous appearance time period and the reappearance time interval.

9 Claims, 16 Drawing Sheets

(51) Int. Cl.
  *G06K 9/00* (2006.01)
  *G08B 25/00* (2006.01)
  *G06T 7/20* (2017.01)
  *H04N 5/232* (2006.01)

(52) U.S. Cl.
  CPC .......... *G06K 9/00771* (2013.01); *G06T 7/20* (2013.01); *G08B 25/00* (2013.01); *H04N 5/232* (2013.01); *H04N 7/18* (2013.01); *G06T 2207/30232* (2013.01)

(56) References Cited

U.S. PATENT DOCUMENTS

| | | | |
|---|---|---|---|
| 10,430,666 B2 * | 10/2019 | Koyama | G06K 9/3241 |
| 2010/0169330 A1 | 7/2010 | Albers et al. | |
| 2010/0231723 A1 * | 9/2010 | Nam | G06K 9/00771 |
| | | | 348/169 |
| 2011/0091069 A1 | 4/2011 | Anabuki et al. | |
| 2012/0019644 A1 * | 1/2012 | Hamabashiri | G06T 7/292 |
| | | | 348/77 |
| 2012/0303572 A1 | 11/2012 | Isozaki | |
| 2015/0201120 A1 | 7/2015 | Irie et al. | |
| 2015/0356129 A1 | 12/2015 | Liu | |
| 2015/0371403 A1 * | 12/2015 | Koyama | G06K 9/00771 |
| | | | 382/103 |
| 2016/0104357 A1 | 4/2016 | Miyano | |
| 2017/0053191 A1 | 2/2017 | Koyama | |
| 2019/0035106 A1 * | 1/2019 | Hirakawa | G06T 7/70 |
| 2019/0156509 A1 | 5/2019 | Hirakawa et al. | |

FOREIGN PATENT DOCUMENTS

| | | | |
|---|---|---|---|
| JP | 2003-325500 A | | 11/2003 |
| JP | 2004-246471 A | | 9/2004 |
| JP | 2004246471 | * | 9/2004 |
| JP | 2006-011728 A | | 1/2006 |
| JP | 2006-109014 A | | 4/2006 |
| JP | 2007-233660 A | | 9/2007 |
| JP | 2010-257451 A | | 11/2010 |
| JP | 2011-081735 A | | 4/2011 |
| JP | 2011-090408 A | | 5/2011 |
| JP | 2011-165054 A | | 8/2011 |
| JP | 2012078950 | * | 4/2012 |
| JP | 2014-164549 A | | 9/2014 |
| JP | 2015-049574 A | | 3/2015 |
| WO | 2014/017403 A1 | | 1/2014 |
| WO | 2014/109127 A1 | | 7/2014 |
| WO | 2014/125882 A1 | | 8/2014 |
| WO | 2014/155922 A1 | | 10/2014 |
| WO | 2015/166612 A1 | | 11/2015 |
| WO | 2016/027410 A1 | | 2/2016 |

OTHER PUBLICATIONS

International Search Report for PCT Application No. PCT/JP2017/005100, dated May 16, 2017.
Japanese Office Action for JP Application No. 2017-148030 dated Aug. 7, 2018, with English Translarion.
Canadian Office Action for CA Application No. 3017835 dated Jul. 12, 2019.
U.S. Office Action for U.S. Appl. No. 16/258,863 dated Jan. 24, 2020.
U.S. Office Action for U.S. Appl. No. 16/258,899 dated Jan. 24, 2020.
U.S. Office Action for U.S. Appl. No. 16/258,899 dated Nov. 12, 2020.
U.S. Office Action for U.S. Appl. No. 16/258,863 dated Jul. 7, 2020 with English Translation.
Japanese Office Action for JP Application No. 2020-040566 dated Mar. 9, 2021 with English Translation.
Japanese Office Communication for JP Application No. 2020-040566 dated Oct. 5, 2021 with English Translation.

* cited by examiner

FIG. 6

| PERSON ID | CONTINUOUS APPEARANCE TIME PERIOD | LATEST EXTRACTION TIMING |
|---|---|---|
| ⋮ | ⋮ | ⋮ |

FIG. 13

| PERSON ID | NUMBER OF INFERENCE PROCESSES | | | |
|---|---|---|---|---|
| | TRAVELER | PICKPOCKET | SUSPICIOUS PERSON | · · · · |
| ⋮ | ⋮ | ⋮ | ⋮ | ⋮ |

FIG. 15

```
SETTING OF PERSONAL CHARACTERISTIC

NAME            [          ]

START TIME    END TIME
CONTINUOUS
APPEARANCE      [        ]    [        ]
TIME PERIOD

REAPPEARANCE    [        ]    [        ]
TIME INTERVAL

[SET] [RETURN]
```

ANALYSIS APPARATUS, ANALYSIS METHOD, AND STORAGE MEDIUM

This application is a National Stage Entry of PCT/JP2017/005100 filed on Feb. 13, 2017, which claims priority from Japanese Patent Application 2016-067538 filed on Mar. 30, 2016, the contents of all of which are incorporated herein by reference, in their entirety.

TECHNICAL FIELD

The invention relates to an analysis apparatus, an analysis method, and a program.

BACKGROUND ART

The related art is disclosed in Patent Document 1. The Patent Document 1 discloses a countermeasure system against suspicious persons which detects the face of a person in a captured image of a scene in a surveillance range and determines whether countermeasures are needed or the degree of countermeasures on the basis of, for example, the size of the face, the time for which the person has been continuously present in the surveillance range, or the number of times the person appears in the surveillance range. It is assumed that, as the length of time or the number of times described above increases, the possibility that the person is a suspicious person increases.

Patent Documents 2 and 3 disclose an index generation apparatus that generates an index in which a plurality of nodes are hierarchized.

RELATED DOCUMENT

Patent Document

[Patent Document 1] Japanese Patent Application Publication No. 2006-11728
[Patent Document 2] WO2014/109127
[Patent Document 3] Japanese Patent Application Publication No. 2015-49574

SUMMARY OF THE INVENTION

Technical Problem

In a case in which, as the time period for which a person has been continuously present or the number of times the person appears increases, the possibility that the person is a suspicious person is determined to be higher as in the technique disclosed in the Patent Document 1, a determination error is likely to occur. For example, a person who continuously works in the surveillance range is determined to be a suspicious person. In order to solve this problem, it is desirable to have various criteria for determination.

An object of the invention is to provide a new technique for inferring a characteristic of a person extracted from an image.

Solution to Problem

In one exemplary embodiment of the invention, there is provided an analysis apparatus comprising: a person extraction unit that analyzes video data to extract a person; a time calculation unit that calculates a continuous appearance time period for which the extracted person has been continuously present in a predetermined area and a reappearance time interval until the extracted person reappears in the predetermined area for each extracted person; and an inference unit that infers a characteristic of the extracted person on the basis of the continuous appearance time period and the reappearance time interval.

In another exemplary embodiment of the invention, there is provided an analysis method performed by a computer, the method comprising: a person extraction step of analyzing video data to extract a person; a time calculation step of calculating a continuous appearance time period for which the extracted person has been continuously present in a predetermined area and a reappearance time interval until the extracted person reappears in the predetermined area for each extracted person; and an inference step of inferring a characteristic of the extracted person on the basis of the continuous appearance time period and the reappearance time interval.

In still another exemplary embodiment of the invention, there is provided a program that causes a computer to function as: a person extraction unit that analyzes video data to extract a person; a time calculation unit that calculates a continuous appearance time period for which the extracted person has been continuously present in a predetermined area and a reappearance time interval until the extracted person reappears in the predetermined area for each extracted person; and an inference unit that infers a characteristic of the extracted person on the basis of the continuous appearance time period and the reappearance time interval.

Advantageous Effects of Invention

According to the invention, it is possible to provide a new technique for inferring the characteristic of a person extracted from an image.

BRIEF DESCRIPTION OF THE DRAWINGS

The above objects and other objects, features and advantages will become more apparent from the following description of the preferred example embodiments and the accompanying drawings below.

FIG. 6 is a diagram schematically illustrating an example of information handled by the analysis apparatus according to the exemplary embodiment.

FIG. 13 is a diagram schematically illustrating an example of the information handled by the analysis apparatus according to the exemplary embodiment.

FIG. 15 is a diagram illustrating an example of a setting screen provided by the analysis apparatus according to the exemplary embodiment.

DESCRIPTION OF EMBODIMENTS

First, an example of the hardware configuration of an apparatus (analysis apparatus) according to an exemplary embodiment will be described. Each unit of the apparatus according to the exemplary embodiment is implemented by an arbitrary combination of software and hardware including a central processing unit (CPU), a memory, a program loaded to the memory, a storage unit (which can store a program loaded from a storage medium, such as a compact disc (CD), or a server on the Internet, in addition to a program that is stored in the apparatus in advance in a shipment stage), such as a hard disk storing the program, and an interface for connection to a network of an arbitrary computer. It will be understood by those skilled in the art that there are various modification examples of the implementation method and the apparatus.

Figure 1:
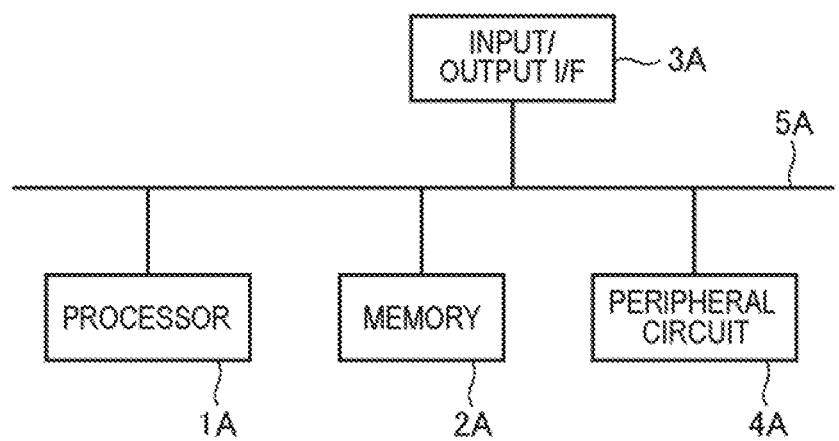
FIG. 1 is a conceptual diagram illustrating an example of the hardware configuration of an apparatus according to an exemplary embodiment.

FIG. 1 is a block diagram illustrating the hardware configuration of the apparatus according to the exemplary embodiment. As illustrated in FIG. 1, the apparatus includes a processor 1A, a memory 2A, an input/output interface 3A, a peripheral circuit 4A, and a bus 5A. The peripheral circuit includes various modules.

The bus 5A is a data transmission path through which the processor 1A, the memory 2A, the peripheral circuit 4A, and the input/output interface 3A transmit and receive data. The processor 1A is an arithmetic processing unit such as a central processing unit (CPU) or a graphics processing unit (GPU). The memory 2A is, for example, a random access memory (RAM) or a read only memory (ROM). The input/output interface 3A includes, for example, an interface for acquiring information from an external apparatus, an external server, and an external sensor. The processor 1A outputs commands to each module and performs calculation on the basis of the calculation results of the modules.

Next, the exemplary embodiment will be described. The functional block diagrams used in the following description of the exemplary embodiment do not illustrate the structure of each hardware unit, but illustrate a functional unit block. In the diagrams, each apparatus is implemented by one device. However, a means of implementing each apparatus is not limited thereto. That is, each apparatus may be physically divided or may be logically divided. The same components are denoted by the same reference numerals and the description thereof will not be repeated.

First Exemplary Embodiment

First, the outline of this exemplary embodiment will be described. An analysis apparatus according to this exemplary embodiment analyzes video data to extract a person. Then, the analysis apparatus calculates the time period (continuous appearance time period) for which the extracted person has been continuously present in a predetermined area and the time interval (reappearance time interval) until the extracted person reappears in the predetermined area after leaving the predetermined area (disappearing from the predetermined area) for each extracted person. Then, the analysis apparatus infers the characteristic of the extracted person on the basis of the continuous appearance time period and the reappearance time interval. The characteristic of the extracted person inferred on the basis of the continuous appearance time period and the reappearance time interval is a kind of information that can be recognized from context or the state of the person. Examples of the characteristic include a traveler, a passerby, a pickpocket, an operator, a migrant worker, a suspicious person, a demonstrator, and a homeless person. Here, the examples are illustrative and are not limited thereto. Hereinafter, this exemplary embodiment will be described in detail.

Figure 2:
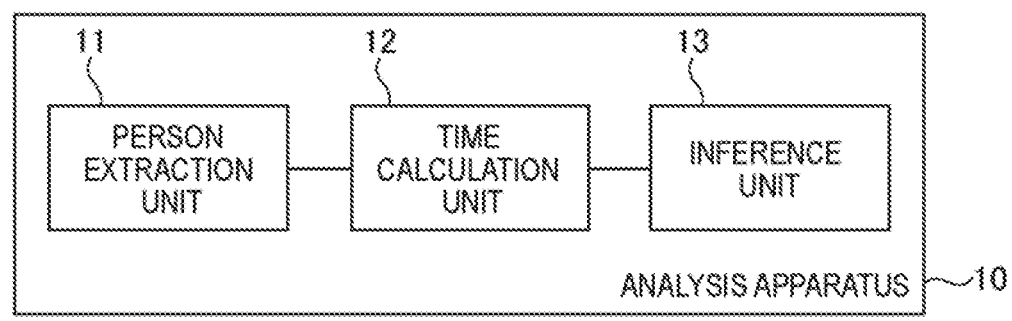
FIG. 2 is an example of a functional block diagram of an analysis apparatus according to the exemplary embodiment.

FIG. 2 is an example of the functional block diagram of an analysis apparatus 10 according to this exemplary embodiment. As illustrated in FIG. 2, the analysis apparatus 10 includes a person extraction unit 11, a time calculation unit 12, and an inference unit 13.

The person extraction unit 11 analyzes video data and extracts a person from the video data. Any technique can be used as a process of extracting a person.

For example, video data which is captured by one or a plurality of cameras (for example, surveillance cameras) installed at predetermined positions is input to the person extraction unit 11. For example, the person extraction unit 11 processes the video data in time series and extracts a person from the video data.

The person extraction unit 11 may process all of the frames included in the video data or process may be performed on a basis of each predetermined frame. Then, the person extraction unit 11 extracts a person from the frame which is a processing target. In addition, the person extraction unit 11 extracts the feature amount (for example, the feature amount of the face) of the outward appearance of the extracted person.

The time calculation unit 12 calculates the continuous appearance time period for which the person extracted by the person extraction unit 11 has been continuously present in a predetermined area and the reappearance time interval until the person reappears in the predetermined area after leaving the predetermined area for each extracted person. Any technique can be used to calculate the continuous appearance time period and the reappearance time interval. Hereinafter, an example will be described and the invention is not limited thereto.

For example, the time period for which a person appears continuously in the video data may be the continuous appearance time period and the time interval until the person reappears after disappearing from the video data may be the reappearance time interval. That is, when an n-th frame to be processed is represented by Fn, for example, it is assumed that a certain person is extracted from each of frames F1 to F500, is not extracted from each of frames F501 to F1500, and is extracted from a frame F1501 again. In this case, the time elapsed from the frame F1 to the frame F500 may be the continuous appearance time period and the time elapsed from the frame F501 to the frame F1501 may be the reappearance time interval.

In this case, an area captured by the camera is the predetermined area. For example, the continuous appearance time and the reappearance time are calculated by the method detailed below, and thus the predetermined area can be expanded to the area captured by the camera and a peripheral area.

Here, it is assumed that video data captured by one camera is a processing target. The time calculation unit 12 calculates an elapsed time t from the extraction of a person A (first person) from the video data to the next extraction of the person A from the video data. Then, when the elapsed time t is less than a predetermined time $t_s$ (a matter of design) (or when the elapsed time t is equal to or less than the predetermined time $t_s$), it is determined that the first person has been continuously present in the predetermined area for the elapsed time t. On the other hand, when the elapsed time t is equal to or greater than the predetermined time $t_s$ (or when the elapsed time t is greater than the predetermined time $t_s$), it is determined that the first person has not been present in the predetermined area for the elapsed time t.

A detailed example will be described with reference to FIG. 3. The elapsed time t1 from the first extraction of the person A to the second extraction of the person A is less than the predetermined time $t_s$. Therefore, the time calculation unit 12 determines that the person A has been continuously present in the predetermined area for the time (elapsed time t1) from the first extraction to the second extraction.

An elapsed time t2 from the second extraction of the person A to the third extraction of the person A is less than the predetermined time $t_s$. Therefore, the time calculation unit 12 determines that the person A has been continuously present in the predetermined area for the time (elapsed time t2) from the second extraction to the third extraction. Then, the time calculation unit 12 determines that the person A has been continuously present in the predetermined area for the time (here, the time from the first extraction to the third extract) for which the state that an elapsed time is less than the predetermined time $t_s$ continues.

An elapsed time t3 from the third extraction of the person A to the fourth extraction of the person A is greater than the predetermined time $t_s$. Therefore, the time calculation unit 12 determines that the person A has not been present in the predetermined area for the time (elapsed time t3) from the third extraction to the fourth extraction. Then, the time calculation unit 12 sets the elapsed time t3 as the reappearance time interval. In addition, the time calculation unit 12 sets (t1+t2) as the continuous appearance time period.

Another example will be described. Here, it is assumed that video data captured by a plurality of cameras is a processing target. All of the plurality of cameras capture the image of a predetermined position in the same predetermined area. For example, all of the plurality of cameras may be installed in the same area of a "∘∘" park. The imaging areas captured by the plurality of cameras may partially overlap each other or may not overlap each other.

The time calculation unit 12 calculates the elapsed time t from the extraction of the first person from video data captured by a first camera to the next extraction of the first person from video data by any camera (which may be the first camera or another camera). When the elapsed time t is less than the predetermined time $t_s$ (a matter of design) (or when the elapsed time t is equal to or less than the predetermined time $t_s$), it is determined that the first person has been continuously present in the predetermined area for the elapsed time t. On the other hand, when the elapsed time t is equal to or greater than the predetermined time $t_s$ (or when the elapsed time t is greater than the predetermined time $t_s$), it is determined that the first person has not been present in the predetermined area for the elapsed time t.

A detailed example will be described with reference to FIG. 4. It is assumed that the person A is extracted from video data captured by a camera A (Cam A) (first extraction) and is then extracted from video data captured by a camera B (Cam B) (second extraction). The elapsed time t1 from the first extraction to the second extraction is less than the predetermined time $t_s$. Therefore, the time calculation unit 12 determines that the person A has been continuously present in the predetermined area for the time (elapsed time t1) from the first extraction to the second extraction.

The elapsed time t2 from the second extraction of the person A from the video data captured by the camera B (Cam B) to the next (third) extraction of the person A from video data captured by a camera C (Cam C) is less than the predetermined time $t_s$. Therefore, the time calculation unit 12 determines that the person A has been continuously present in the predetermined area for the time (elapsed time t2) from the second extraction to the third extraction. Then, the time calculation unit 12 determines that the person A has been continuously present in the predetermined area for the time (the time from the first extraction to the third extract) for which the state that an elapsed time is less than the predetermined time $t_s$ continues.

The elapsed time t3 from the third extraction of the person A from the video data captured by the camera C (Cam C) to the next (fourth) extraction of the person A from the video data captured by the camera B (Cam B) is greater than the predetermined time $t_s$. Therefore, the time calculation unit 12 determines that the person A has not been present in the predetermined area for the time (elapsed time t3) from the third extraction to the fourth extraction. Then, the time calculation unit 12 sets the elapsed time t3 as the reappearance time interval. In addition, the time calculation unit 12 sets a time (t1+t2) as the continuous appearance time period.

Figure 3:
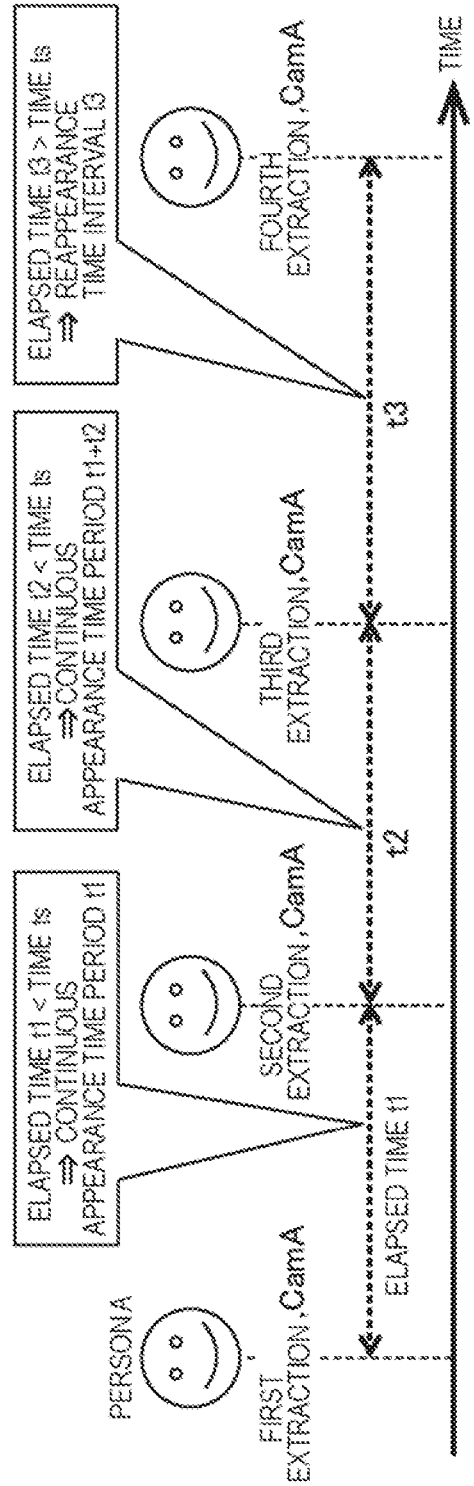
FIG. 3 is a diagram illustrating an example of a method of calculating a continuous appearance time period and a reappearance time interval according to the exemplary embodiment.
Figure 4:
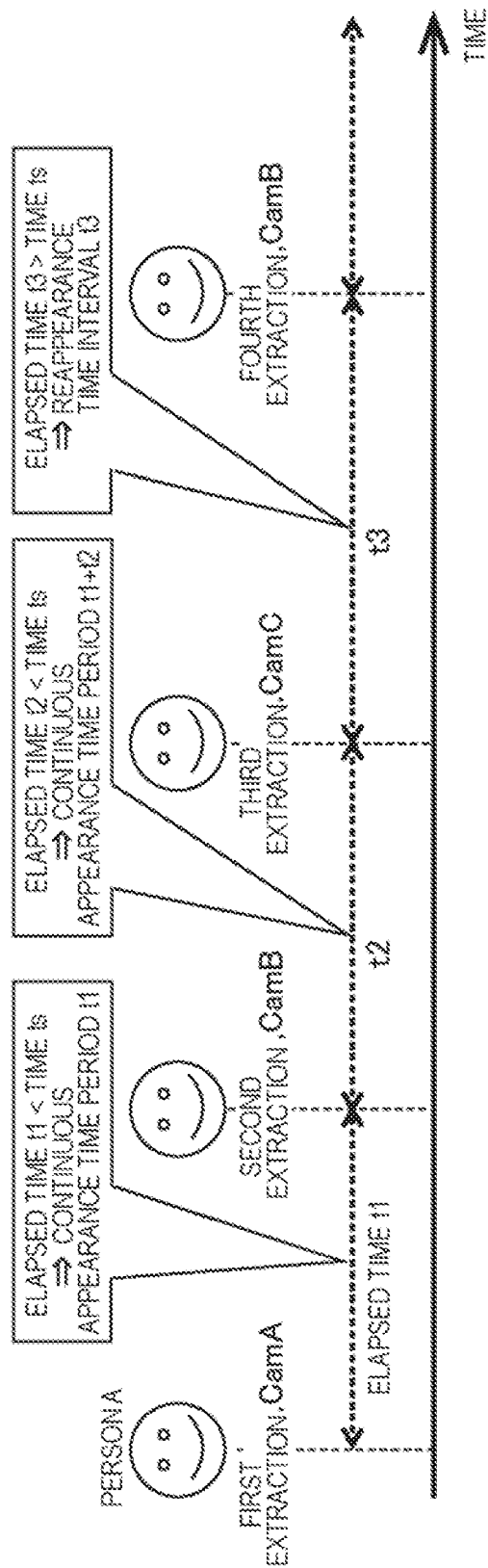
FIG. 4 is a diagram illustrating an example of the method of calculating the continuous appearance time period and the reappearance time interval according to the exemplary embodiment.

Next, this exemplary embodiment will be described on the assumption that the calculation method described with reference to FIGS. 3 and 4 is used.

Incidentally, it is necessary to determine whether a person extracted from a certain frame and a person extracted from the previous frame are the same person, in order to perform the above-mentioned process. All of pairs of the feature amounts of the outward appearance of each person extracted from the previous frame and the feature amounts of the outward appearance of each person extracted from a certain frame may be compared to perform the determination described above. However, in the case of this process, as the accumulated data of persons increases, the number of pairs to be compared increases and thus processing load increases. Therefore, for example, the method described below may be adopted.

Figure 5:
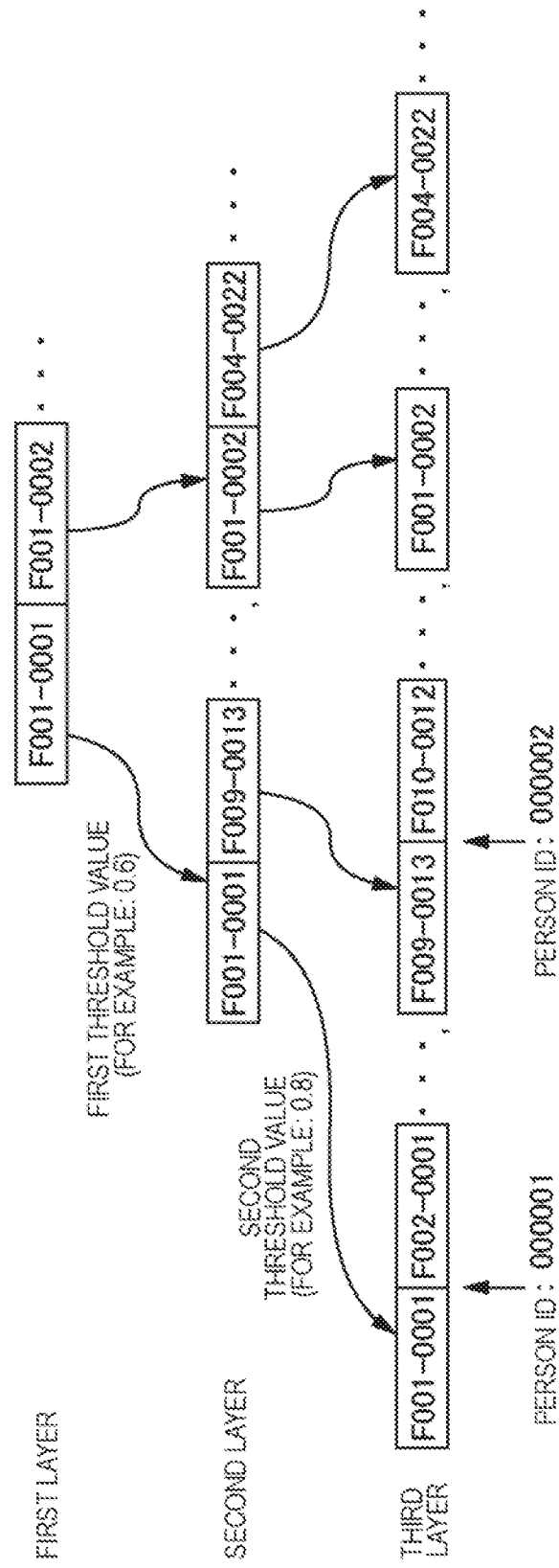
FIG. 5 is a diagram illustrating an example of index information that may be used in the exemplary embodiment.

For example, the extracted person may be indexed as illustrated in FIG. 5 to determine whether a person is identical to a previously extracted person by using the index. The use of the index makes it possible to increase a processing speed. The details of the index and a method for generating the index are disclosed in the Patent Documents 2 and 3. Next, the structure of the index illustrated in FIG. 5 and a method for using the index will be described in brief.

An extraction identifier (ID) "Fooo-oooo" illustrated in FIG. 5 is identification information which is given to each person extracted from each frame. "Fooo" is frame identification information and numbers following a hyphen are identification information of each person extracted from each frame. In a case in which the same person is extracted from different frames, different extraction IDs are given to the person.

In a third layer, nodes corresponding to all of the extraction IDs obtained from the processed frames are arranged. Among a plurality of nodes arranged in the third layer, nodes with similarity (similarity between the feature amounts of the outward appearance) that is equal to or higher than a first level are grouped. In the third layer, a plurality of extraction IDs which are determined to indicate the same person are grouped. That is, the first level of the similarity is set to a value that can implement the grouping. Person identification information (person ID) is given so as to correspond to each group in the third layer.

In a second layer, one node (representative) which is selected from each of a plurality of groups in the third layer is arranged and is associated with the group in the third layer. Among a plurality of nodes arranged in the second layer, nodes with similarity that is equal to or higher than a second level are grouped. The second level of the similarity is lower than the first level. That is, the nodes which are not grouped together on the basis of the first level may be grouped together on the basis of the second level.

In a first layer, one node (representative) which is selected from each of a plurality of groups in the second layer is arranged and is associated with the group in the second layer.

For example, the time calculation unit 12 indexes a plurality of extraction IDs obtained by the above-mentioned process as illustrated in FIG. 5.

Then, when a new extraction ID is obtained from a new frame, the time calculation unit 12 determines whether a person corresponding to the extraction ID is identical to a previously extracted person using the information. In addition, the time calculation unit 12 adds the new extraction ID to the index. Next, this process will be described.

First, the time calculation unit 12 sets a plurality of extraction IDs in the first layer as a comparison target. The person extraction unit 11 makes a pair of the new extraction ID and each of the plurality of extraction IDs in the first layer. Then, the person extraction unit 11 calculates similarity (similarity between the feature amounts of the outward appearance) for each pair and determines whether the calculated similarity is equal to or greater than a first threshold value (is equal to or higher than a predetermined level).

In a case in which an extraction ID with similarity that is equal to or greater than the first threshold value is not present in the first layer, the time calculation unit 12 determines that the person corresponding to the new extraction ID is not identical to any previously extracted person. Then, the time calculation unit 12 adds the new extraction ID to the first to third layers and associates them with each other. In the second and third layers, a new group is generated by the added new extraction ID. In addition, a new person ID is issued in correspondence with the new group in the third layer. Then, the person ID is specified as the person ID of the person corresponding to the new extraction ID.

On the other hand, in a case in which the extraction ID with similarity that is equal to or greater than the first threshold value is present in the first layer, the time calculation unit 12 changes a comparison target to the second layer. Specifically, the group in the second layer associated with the "extraction ID in the first layer which has been determined to have similarity equal to or greater than the first threshold value" is set as a comparison target.

Then, the time calculation unit 12 makes a pair of the new extraction ID and each of a plurality of extraction IDs included in the group to be processed in the second layer. Then, the time calculation unit 12 calculates similarity for each pair and determines whether the calculated similarity is equal to or greater than a second threshold value. The second threshold value is greater than the first threshold value.

In a case in which an extraction ID with similarity that is equal to or greater than the second threshold value is not present in the group to be processed in the second layer, the time calculation unit 12 determines that the person corresponding to the new extraction ID is not identical to any previously extracted person. Then, the time calculation unit 12 adds the new extraction ID to the second and third layers and associates them with each other. In the second layer, the new extraction ID is added to the group to be processed. In the third layer, a new group is generated by the added new extraction ID. In addition, a new person ID is issued in correspondence with the new group in the third layer. Then, the time calculation unit 12 specifies the person ID as the person ID of the person corresponding to the new extraction ID.

On the other hand, in a case in which the extraction ID with similarity that is equal to or greater than the second threshold value is present in the group to be processed in the second layer, the time calculation unit 12 determines that the person corresponding to the new extraction ID is identical to a previously extracted person. Then, the time calculation unit 12 puts the new extraction ID into the group in the third layer associated with the "extraction ID in the second layer which has been determined to have similarity equal to or greater than the second threshold value". In addition, the time calculation unit 12 determines the person ID corresponding to the group in the third layer as the person ID of the person corresponding to the new extraction ID.

For example, in this way, it is possible to associate a person ID with one extraction ID or each of a plurality of extraction IDs extracted from a new frame.

For example, the time calculation unit 12 may manage information illustrated in FIG. 6 for each extracted person ID. Then, the time calculation unit 12 may calculate the continuous appearance time period and the reappearance time interval, using the information. In the information illustrated in FIG. 6, the person ID, the continuous appearance time period, and the latest extraction timing are associated with each other.

The values of the continuous appearance time period and the latest extraction timing are updated as needed. For example, when a certain person is extracted from the video data first and a new person ID is added to the information illustrated in FIG. 6, "0" is recorded as the continuous appearance time period. In addition, the extraction timing is recorded as the latest extraction timing. The extraction timing is represented by, for example, date and time information. The extraction timing in this example corresponds to, for example, the first extraction illustrated in FIG. 3. Then, the time calculation unit 12 waits for the next extraction.

Then, in a case in which the person is extracted for the second time, it is determined whether the person has been continuously present for the elapsed time t1 on the basis of the result of the large and small comparison between the elapsed time t1 and the predetermined time $t_s$, as described above. The elapsed time t1 is calculated on the basis of, for example, the value in the field of latest extraction timing and the extraction timing of the second time. In a case in which it is determined that the person has been present, the value of the continuous appearance time period is updated. Specifically, the sum of the value recorded at that time and the elapsed time t1 is recorded in the field. Here, t1 (=0+t1) is recorded. Then, the latest extraction timing is updated to the extraction timing of the second time. Then, the time calculation unit 12 waits for the next extraction.

Then, in a case in which the person is extracted for the third time, it is determined whether the person has been continuously present for the elapsed time t2 on the basis of the result of the large and small comparison between the elapsed time t2 and the predetermined time $t_s$, as described above. The elapsed time t2 is calculated on the basis of, for example, the value in the field of latest extraction timing and the extraction timing of the third time. In a case in which it is determined that the person has been present, the value of the continuous appearance time period is updated. Specifically, the sum (t1+t2) of the value (t1) recorded at that time and the elapsed time t2 is recorded in the field. Then, the latest extraction timing is updated to the extraction timing of the third time. Then, the time calculation unit 12 waits for the next extraction.

Then, in a case in which the person is extracted for the fourth time, it is determined whether the person has been continuously present for the elapsed time t3 on the basis of the result of the large and small comparison between the elapsed time t3 and the predetermined time $t_s$, as described above. The elapsed time t3 is calculated on the basis of, for example, the value in the field of latest extraction timing and the extraction timing of the fourth time. In a case in which it is determined that the person has not been present, the value of the continuous appearance time period at that time is fixed as the continuous appearance time period of the person. In addition, the elapsed time t3 is fixed as the reappearance time interval of the person. Then, a pair of the fixed continuous appearance time period and the fixed reappearance time interval is input to the inference unit 13.

In addition, the value of the continuous appearance time period is updated. Specifically, "0" is recorded in the field. Then, the latest extraction timing is updated to the extraction timing of the fourth time. Then, the time calculation unit 12 waits for the next extraction. Then, the same process as described above is repeated.

Returning to FIG. 2, the inference unit 13 infers the characteristic of the extracted person on the basis of the continuous appearance time period and the reappearance time interval. The inference unit 13 infers the characteristic of the person on the basis of the relationship between the continuous appearance time period and the reappearance time interval. The inference unit 13 infers the characteristic of the person on the basis of the pair of the continuous appearance time period and the reappearance time interval input from the time calculation unit 12.

For example, the inference unit 13 may infer the characteristic of the person (hereinafter, referred to as a personal characteristic in some cases) on the basis of correspondence information (correspondence information indicating the relationship between the continuous appearance time period and the reappearance time interval) in which the pair of the continuous appearance time period and the reappearance time interval is associated with the inferred characteristic.

Figure 7:
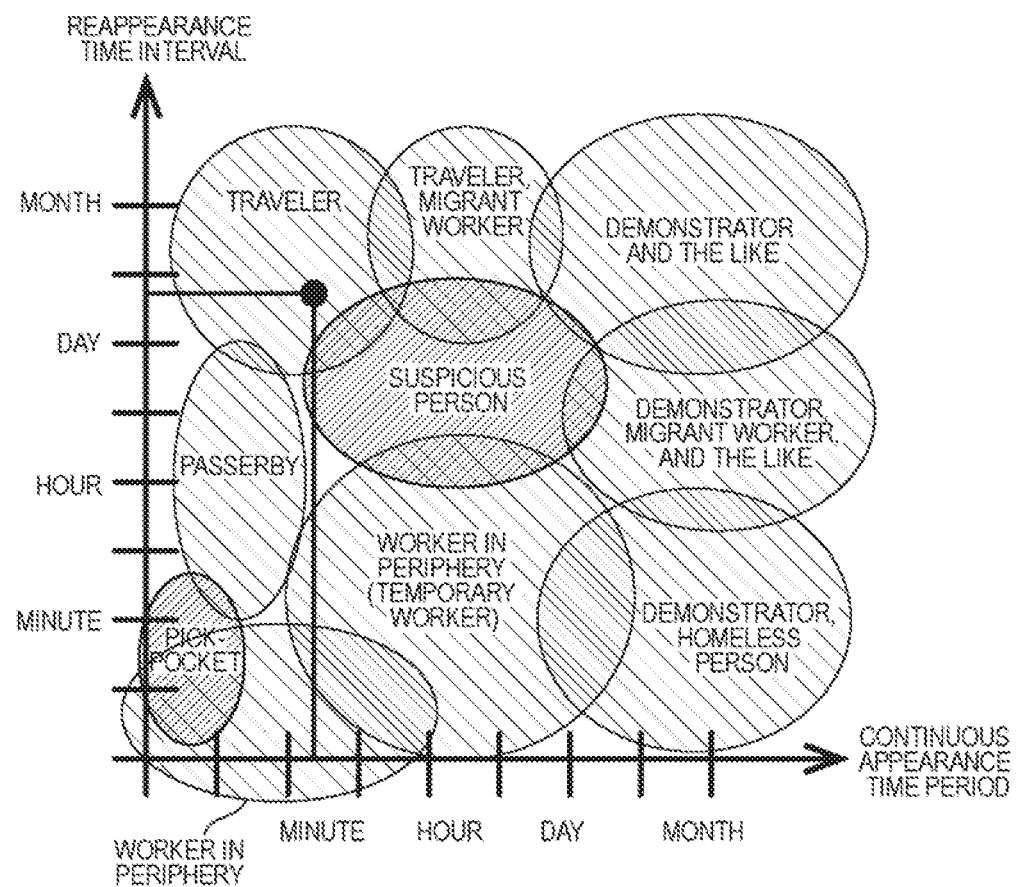
FIG. 7 is a diagram schematically illustrating an example of the information handled by the analysis apparatus according to the exemplary embodiment.

FIG. 7 illustrates an example of the correspondence information. The correspondence information is represented by a graph in which one axis (the horizontal axis in FIG. 7) indicates the continuous appearance time period and the other axis (the vertical axis in FIG. 7) indicates the reappearance time interval. An area on the graph is divided into a plurality of areas and a personal characteristic is associated with each area. The divided areas illustrated in FIG. 7 or the personal characteristic associated with each area are exemplified as a conceptual diagram for illustrating the invention and the correspondence information is not limited to the content.

In a case in which the correspondence information is used, the inference unit 13 determines which personal characteristic area the pair of the continuous appearance time period and the reappearance time interval is located in, as illustrated in FIG. 7, and infers the personal characteristic on the basis of the determination result.

As another example, the inference unit 13 may infer the personal characteristic on the basis of the correspondence information having different contents for each time slot during which a person appears.

Figure 8:
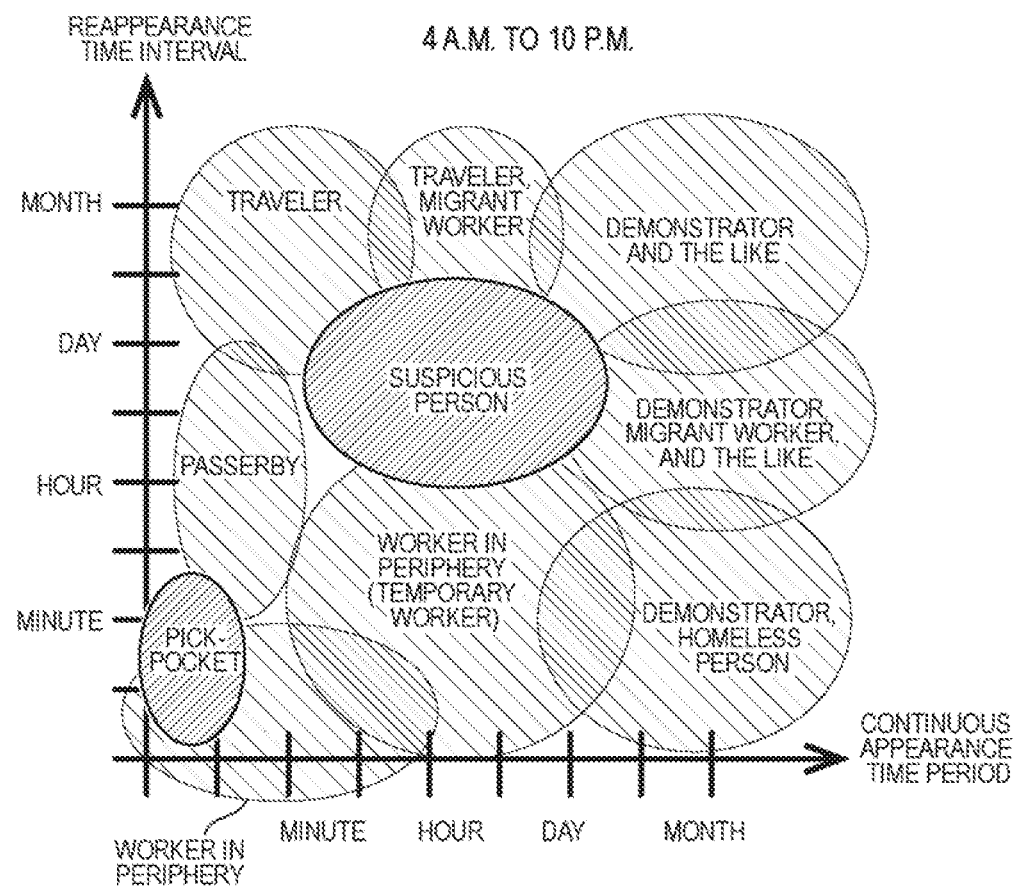
FIG. 8 is a diagram schematically illustrating an example of the information handled by the analysis apparatus according to the exemplary embodiment.
Figure 9:
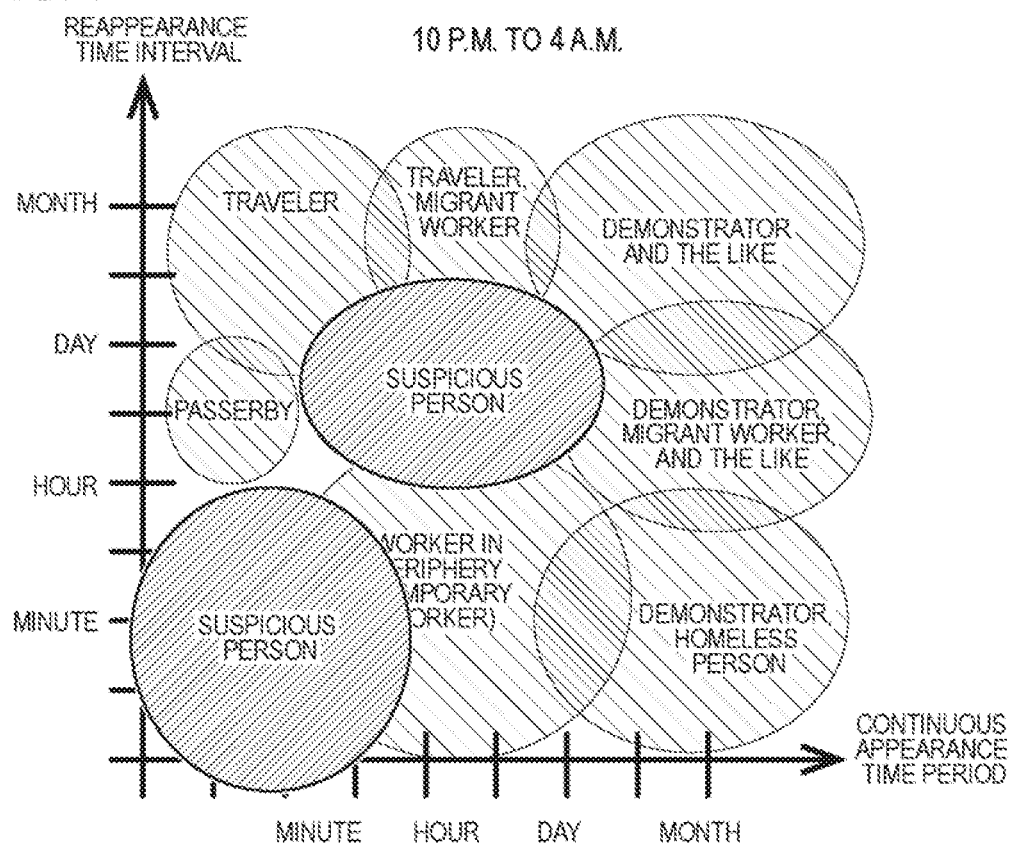
FIG. 9 is a diagram schematically illustrating an example of the information handled by the analysis apparatus according to the exemplary embodiment.

That is, as illustrated in FIGS. 8 and 9, the inference unit 13 may store correspondence information for each time slot. FIG. 8 corresponds to a time slot from 4 a.m. to 10 p.m. and FIG. 9 corresponds to a time slot from 10 p.m. to 4 a.m. As can be seen from the comparison between the correspondence information items illustrated in FIGS. 8 and 9, the contents of the correspondence information items are different from each other. The inference unit 13 may determine one correspondence information item based on the time slot during which the extracted person appears and may infer the personal characteristic on the basis of the determined correspondence information item, using the same method as described above.

For example, the inference unit 13 may use correspondence information corresponding to a time slot including a representative timing for the period of time for which the extracted person appears. The representative timing may be, for example, the timing (the first extraction timing in the example illustrated in FIG. 3) when the person is extracted first, the last extraction timing (the third extraction timing in the example illustrated in FIG. 3), an intermediate timing between the first extraction timing and the last extraction timing, or other timings.

In addition, the inference unit 13 may calculate the overlapping period between the time slot corresponding to each correspondence information item and the time period for which the person appears. Then, the inference unit 13 may use the correspondence information corresponding to the longer overlapping period. For example, in a case in which the appearance period is from 2 a.m. to 5 a.m., the overlapping period between the time slot (from 4 a.m. to 10 p.m.) corresponding to the correspondence information illustrated in FIG. 8 and the appearance period is 1 hour from 4 a.m. to 5 a.m. In contrast, the overlapping period between the time slot (from 10 p.m. to 4 a.m.) corresponding to the correspondence information illustrated in FIG. 9 and the appearance period is 2 hours from 2 a.m. to 4 a.m. In this case, the inference unit 13 may use the correspondence information illustrated in FIG. 9.

In the above-mentioned example, two correspondence information items corresponding to two time slots are used. However, the number of correspondence information items is a matter of design and is not limited thereto.

Furthermore, the inference unit 13 may infer the personal characteristic on the basis of the continuous appearance time period, the reappearance time interval, data indicating a probability distribution which is stored in advance, and the correspondence information.

Figure 10:
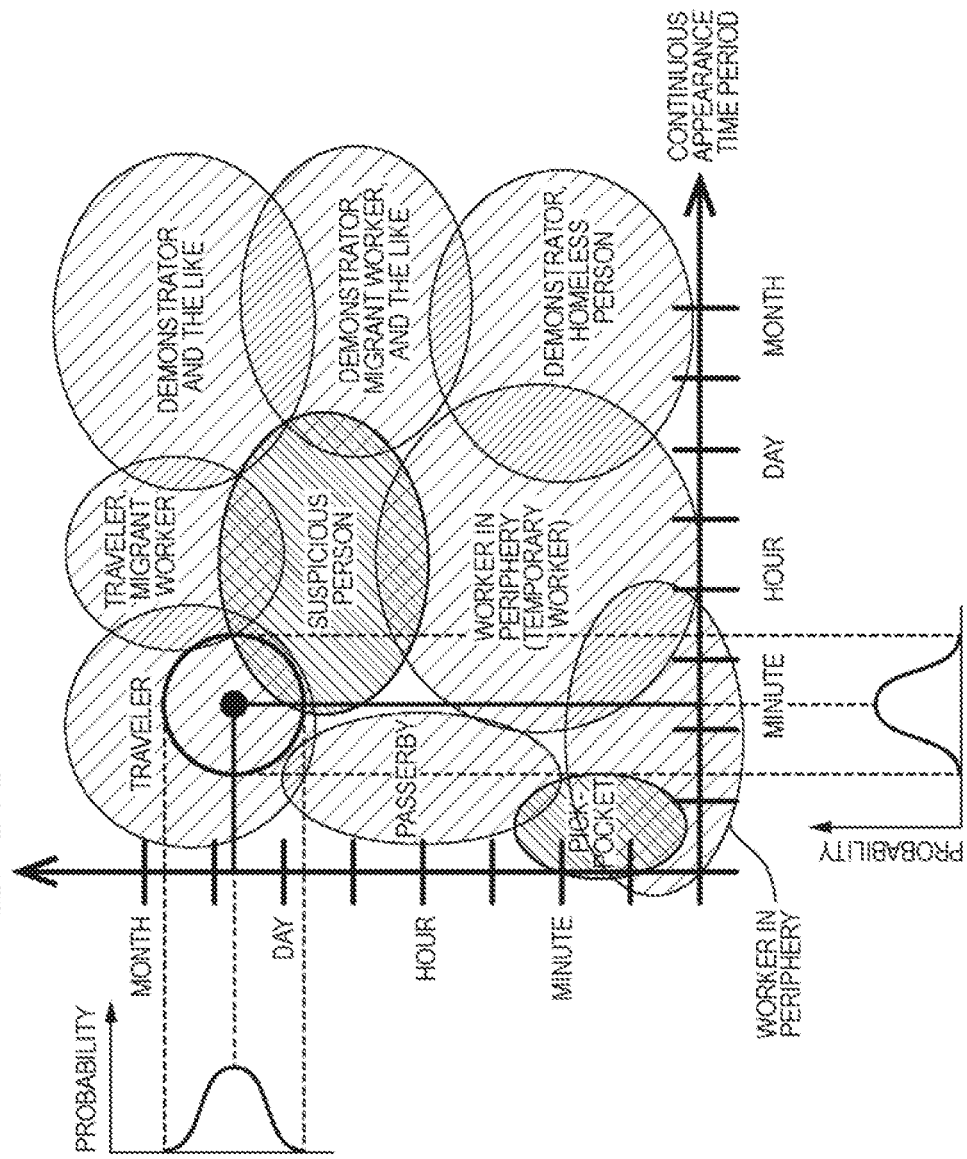
FIG. 10 is a diagram schematically illustrating an example of the information handled by the analysis apparatus according to the exemplary embodiment.

For example, as illustrated in FIG. 10, the inference unit 13 sets a point corresponding to the pair of the continuous appearance time period and the reappearance time interval as a peak position of the probability distribution. Then, the inference unit 13 extracts all personal characteristics corresponding to the area including a portion in which probability is greater than 0. In addition, the inference unit 13 calculates probability corresponding to each personal characteristic on the basis of the data of the probability distribution. For example, the inference unit 13 may calculate a statistic (for example, a maximum value and an intermediate value) in the probability included in each area as the probability corresponding to the personal characteristic.

The analysis apparatus 10 may include a notification unit, which is not illustrated in FIG. 2. When an extracted person is inferred to be a predetermined personal characteristic (for example, a suspicious person), the notification unit notifies an operator of the person and information indicating that the extracted person is inferred to be the predetermined personal characteristic. The notification can be implemented through all types of output devices such as a display, an emailer, a speaker, an alarm lamp, and a printer. In the notification process, the notification unit may notify an operator of the image of the face of the person.

The analysis apparatus 10 may include a storage unit that stores the inference result of the inference unit 13 and an output unit that outputs the inference result, which is not illustrated in FIG. 2. The storage unit stores the person ID and the inference result in association with each other. The storage unit may store one or a plurality of image data items (image data including the person) in association with the person ID. In addition, the storage unit may store the timing (date and time information) when each person appears.

Then, the output unit may acquire predetermined information from the storage unit and output the predetermined information, in accordance with an operation of the operator. For example, when an input specifying the personal characteristic is received, a list of the persons corresponding to the personal characteristic may be displayed. In addition, when an input specifying the personal characteristic and a period is received, a list of the persons who have been inferred to be the personal characteristic within the period may be displayed. The display of the list may be implemented, using image data corresponding to each person.

Figure 11:
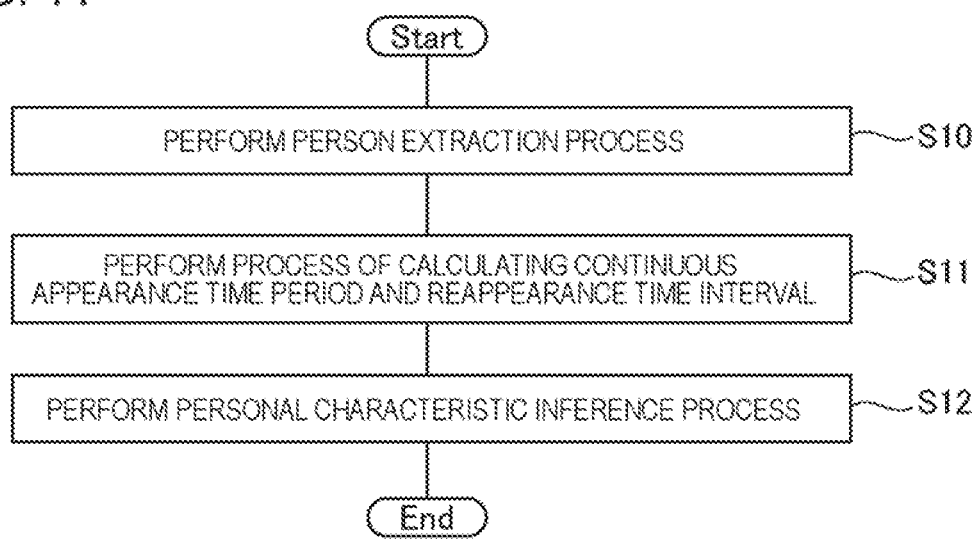
FIG. 11 is a flowchart illustrating an example of the flow of a process of the analysis apparatus according to the exemplary embodiment.

Next, an example of the flow of the process of the analysis apparatus 10 according to this exemplary embodiment will be described with reference to the flowchart illustrated in FIG. 11.

In a person extraction step S10, the person extraction unit 11 analyzes video data to extract a person.

In a continuous appearance time period and reappearance time interval calculation step S11, the time calculation unit 12 calculates the continuous appearance time period for which each person extracted in S10 has been continuously present and the reappearance time interval until the person reappears in a predetermined area after leaving the predetermined area.

In a personal characteristic inference step S12, the inference unit 13 infers the characteristic of the extracted person on the basis of the continuous appearance time period and the reappearance time interval calculated in S11.

According to the above-described exemplary embodiment, it is possible to infer the personal characteristic on the basis of the continuous appearance time period for which a person has been continuously present in a predetermined area and the reappearance time interval until the person reappears after leaving the predetermined area. That is, it is possible to infer the personal characteristic on the basis of new information such as the reappearance time interval. Therefore, for example, the accuracy of inference is expected to be improved and an inference technique is expected to progress.

According to this exemplary embodiment, it is possible to infer the personal characteristic on the basis of a pair of the continuous appearance time period and the reappearance time interval. In the case of this exemplary embodiment, the personal characteristic is inferred not on the basis of the criterion that "as the continuous appearance time period increases, the possibility that a person is a suspicious person increases". However, in a case in which the position (a position in a two-dimensional coordinate illustrated in FIG. 7) of a pair of the value of the continuous appearance time period and the value of the reappearance time interval is included in a predetermined range, the person is inferred to be a certain personal characteristic (for example, a suspicious person). As such, by inferring the personal characteristic on the basis of a plurality of information items (the continuous appearance time period and the reappearance time interval), it is possible to improve the accuracy of inference.

According to this exemplary embodiment, it is possible to infer the personal characteristic on the basis of a plurality of correspondence information items with different contents for each time slot during which a person appears. It is inferred that there is a large difference in personal characteristics between a person who appears during the day and a person who appears during the night. Since the personal characteristic is inferred considering the appearance timing, it is possible to improve the accuracy of inference.

According to this exemplary embodiment, it is possible to infer the personal characteristic, using a probability distribution. The output result of the inference unit 13 is just the inference result and is not 100 percent accurate. Therefore, there is the possibility that the person, who is essentially to be inferred as a suspicious person, is inferred as another personal characteristic such as a traveler. The inference of possible personal characteristics using probability distributions enables a wide inference of possible personal characteristics. For example, in the case of the above-mentioned example, in addition to a traveler, a suspicious person can be inferred as a possible personal characteristic.

According to this exemplary embodiment, the continuous appearance time period and the reappearance time interval can be calculated by the method described with reference to FIGS. 3 and 4. In the case of this calculation method, the area captured by the camera and the periphery of the area are set as a predetermined area and the continuous appearance time period and the reappearance time interval can be calculated for the predetermined area. That is, it is possible to expand the predetermined area to an area which is not captured by the camera.

As a modification example of this exemplary embodiment, in the correspondence information, not all pairs of the continuous appearance time period and the reappearance time interval are necessarily associated with personal characteristics as illustrated in, for example, FIG. 7. For example, the correspondence information may include only some personal characteristics (for example, a suspicious person and a pickpocket) of the information illustrated in FIG. 7. In using such correspondence information, in a case in which the values of the continuous appearance time period and the reappearance time interval correspond to the personal characteristics (for example, a suspicious person and a pickpocket), the personal characteristic is inferred. On the other hand, in a case in which the values of the continuous appearance time period and the reappearance time interval correspond to neither of the personal characteristics (for example, a suspicious person and a pickpocket), the person is inferred not to be the personal characteristics. This modification example can also be applied to all of the exemplary embodiments described below.

Second Exemplary Embodiment

An analysis apparatus 10 according to this exemplary embodiment stores the personal characteristic inferred by the method described in the first exemplary embodiment in association with each person. In a case in which a certain person appears repeatedly in a predetermined area, the analysis apparatus 10 calculates the continuous appearance time period and the reappearance time interval whenever the person appears. On all such occasion, on the basis of the calculation result, a personal characteristic is inferred. On the basis of the inference result, the analysis apparatus 10 counts the number of times each personal characteristic is inferred, for each person. Then, the analysis apparatus 10 calculates the reliability of each inferred personal characteristic on the basis of the number of counts. Hereinafter, this exemplary embodiment will be described in detail.

Figure 12:
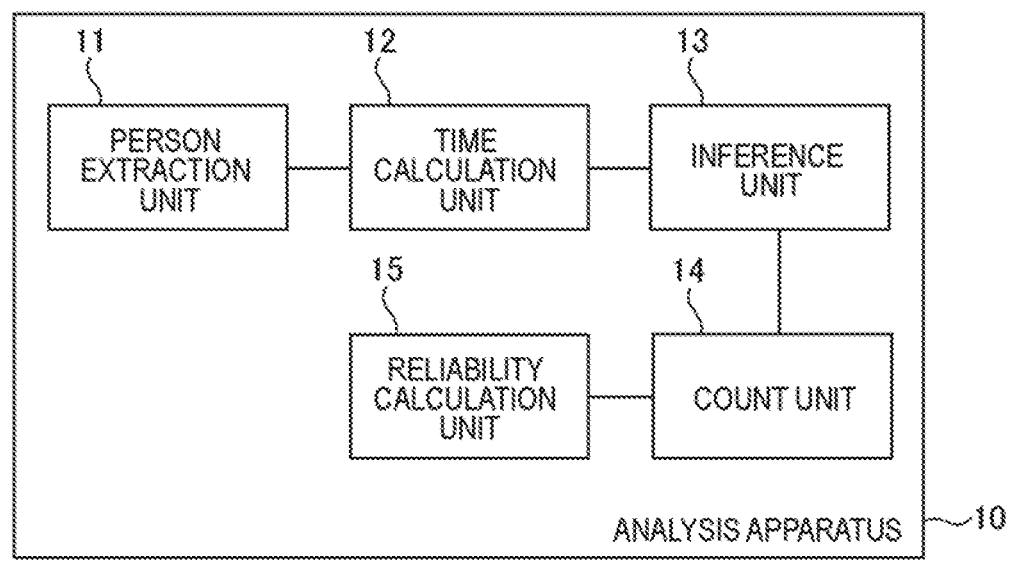
FIG. 12 is an example of the functional block diagram illustrating the analysis apparatus according to the exemplary embodiment.

FIG. 12 illustrates an example of the functional block diagram of the analysis apparatus 10 according to this exemplary embodiment. As illustrated in FIG. 12, the analysis apparatus 10 includes a person extraction unit 11, a time calculation unit 12, an inference unit 13, a count unit 14, and a reliability calculation unit 15. The analysis apparatus 10 may further include the notification unit, the storage unit, and the output unit described in the first exemplary embodiment, which is not illustrated. The person extraction unit 11, the time calculation unit 12, the inference unit 13, the notification unit, the storage unit, and the output unit have the same structure as those in the first exemplary embodiment.

The count unit 14 counts the number of times each personal characteristic which is inferred in correspondence with each person is inferred.

For example, the count unit 14 manages information illustrated in FIG. 13. In the information illustrated in FIG. 13, a person ID is associated with the number of times each personal characteristic is inferred. The count unit 14 updates the information on the basis of the inference result of the inference unit 13.

Whenever a certain person appears repeatedly in a predetermined area, the time calculation unit 12 calculates the continuous appearance time period and the reappearance time interval. On all such occasion, the inference unit 13 infers the personal characteristic on the basis of the continuous appearance time period and the reappearance time interval calculated whenever the certain person appears repeatedly in the predetermined area.

The count unit 14 updates the information illustrated in FIG. 13 on the basis of the result inferred by the inference unit 13 in such a way.

The reliability calculation unit 15 calculates the reliability of the inferred personal characteristic on the basis of the number of times each personal characteristic which is inferred in correspondence with a certain person is inferred. The larger the number of times of inference is, the higher the reliability is calculated by the reliability calculation unit 15.

The output unit may output predetermined information on the basis of the inference result of the inference unit 13 and the calculation result of the reliability calculation unit 15.

The output unit can output the predetermined information in accordance with an operation of the operator.

For example, when an input specifying a personal characteristic and reliability conditions (for example, reliability is equal to or higher than a predetermined level) is received, a list of the persons who are inferred to be the personal characteristic with reliability equal to or higher than the predetermined level may be displayed. The display of the list may be implemented using image data corresponding to each person.

According to the above-described exemplary embodiment, it is possible to obtain the same advantageous effect as that in the first exemplary embodiment. In addition, it is possible to calculate the reliability of each inferred personal characteristic on the basis of many inference results which are stored in correspondence with each person. As a result, according to this exemplary embodiment, it is possible to improve the accuracy of inferring the personal characteristic of each person.

Third Exemplary Embodiment

An analysis apparatus 10 according to this exemplary embodiment provides a function of setting correspondence information in which a pair of the continuous appearance time period and the reappearance time interval is associated with a personal characteristic.

Figure 14:
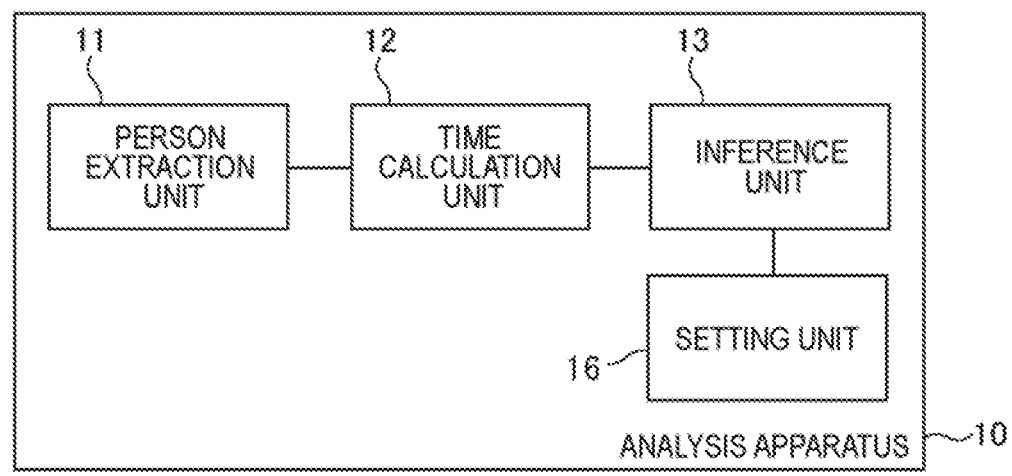
FIG. 14 is an example of the functional block diagram illustrating the analysis apparatus according to the exemplary embodiment.

FIG. 14 illustrates an example of the functional block diagram of the analysis apparatus 10 according to this exemplary embodiment. As illustrated in FIG. 14, the analysis apparatus 10 includes a person extraction unit 11, a time calculation unit 12, an inference unit 13, and a setting unit 16. The analysis apparatus 10 may further include a count unit 14, a reliability calculation unit 15, a notification unit, a storage unit, and an output unit, which are not illustrated in FIG. 14. The person extraction unit 11, the time calculation unit 12, the count unit 14, the reliability calculation unit 15, the notification unit, the storage unit, and the output unit have the same structure as those in the first and second exemplary embodiments.

The setting unit 16 has a function of setting the correspondence information in which a pair of the continuous appearance time period and the reappearance time interval is associated with a personal characteristic. The setting unit 16 can set the correspondence information in accordance with an input from the user.

For example, the setting unit 16 may output a setting screen illustrated in FIG. 15 through an output device such as a display. The setting screen is a screen for receiving input of the name of a personal characteristic, the start time and end time of the continuous appearance time period, and the start time and end time of the reappearance time interval.

Figure 16:
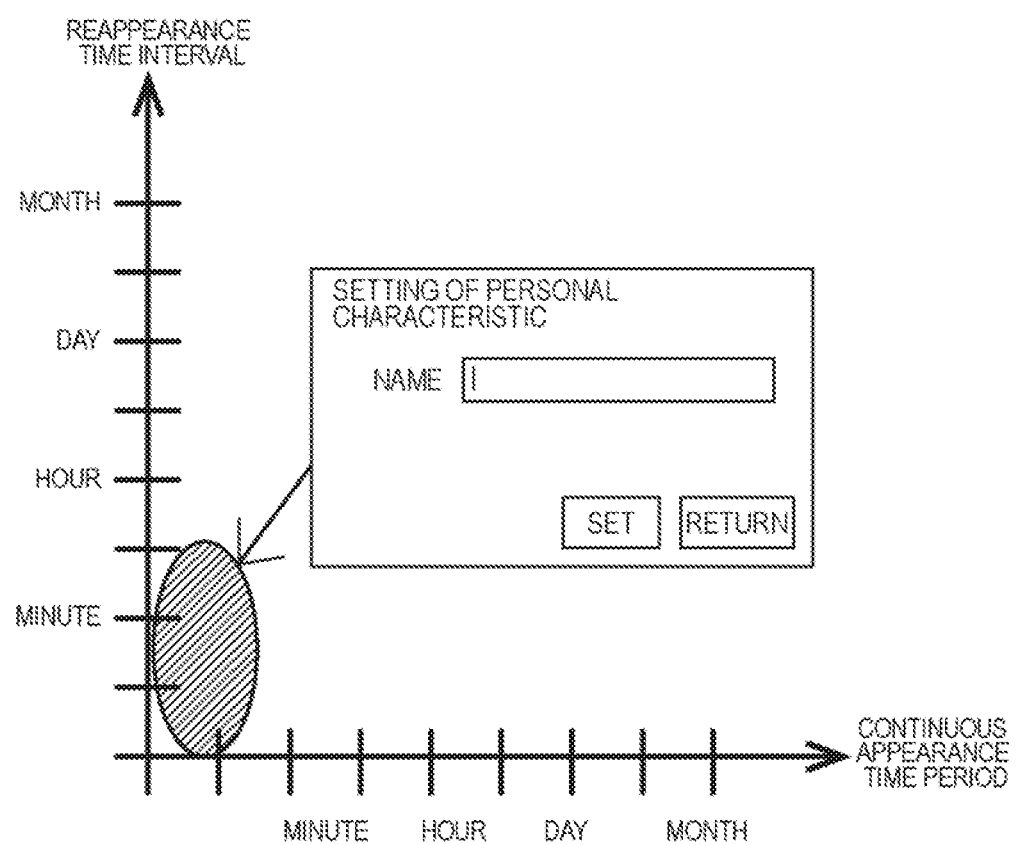
FIG. 16 is a diagram illustrating an example of the setting screen provided by the analysis apparatus according to the exemplary embodiment.

In addition, the setting unit 16 may output a setting screen illustrated in FIG. 16 through an output device such as a display. The setting screen is a screen for receiving specification of a predetermined area on a graph in which one axis (the horizontal axis in FIG. 16) indicates the continuous appearance time period and the other axis (the vertical axis in FIG. 16) indicates the reappearance time interval and an input of the name of the personal characteristic corresponding to the area.

The inference unit 13 infers a personal characteristic on the basis of the correspondence information set by the setting unit 16. The other structures of the inference unit 13 are the same as those in the first and second exemplary embodiments.

According to the above-described exemplary embodiment, it is possible to obtain the same advantageous effect as that in the first and second exemplary embodiments. In addition, it is possible to freely set various personal characteristics. By setting a personal characteristic of a person to be detected in the video data, it is possible to detect a person with the personal characteristic.

Hereinafter, an example of reference exemplary embodiments will be additionally described.

1. An analysis apparatus including: a person extraction unit that analyzes video data to extract a person; a time calculation unit that calculates a continuous appearance time period for which the extracted person has been continuously present in a predetermined area and a reappearance time interval until the extracted person reappears in the predetermined area for each extracted person; and an inference unit that infers a characteristic of the extracted person on the basis of the continuous appearance time period and the reappearance time interval.

2. The analysis apparatus described in 1, in which the inference unit infers the characteristic of the person on the basis of a relationship between the continuous appearance time period and the reappearance time interval.

3. The analysis apparatus described in 1 or 2 further including: a count unit that counts the number of times each characteristic which is inferred in correspondence with each person is inferred; and a reliability calculation unit that calculates reliability of the inferred characteristic on the basis of the number of times each characteristic which is inferred in correspondence with a certain person is inferred.

4. The analysis apparatus described in any one of 1 to 3, in which the inference unit infers the characteristic of the person on the basis of correspondence information in which a pair of the continuous appearance time period and the reappearance time interval is associated with a characteristic.

5. The analysis apparatus described in 4, in which the inference unit infers the characteristic of the person on the basis of the correspondence information having different contents for each time slot during which the person appears.

6. The analysis apparatus described in 4 or 5, in which the inference unit infers the characteristic of the person on the basis of the continuous appearance time period, the reappearance time interval, a probability distribution, and the correspondence information.

7. The analysis apparatus described in any one of 1 to 6, in which, in a case in which a time t elapsed from the extraction of a first person from the video data to the next extraction of the first person from the video data is less than a predetermined time $t_s$, the time calculation unit determines that the first person has been continuously present in the predetermined area for the elapsed time t, and in a case in which the elapsed time t is equal to or greater than the predetermined time $t_s$, the time calculation unit determines that the first person has not been present in the predetermined area for the elapsed time t.

8. An analysis method performed by a computer including: a person extraction step of analyzing video data to extract a person; a time calculation step of calculating a continuous appearance time period for which the extracted person has been continuously present in a predetermined area and a reappearance time interval until the extracted person reappears in the predetermined area for each extracted person; and an inference step of inferring a characteristic of the extracted person on the basis of the continuous appearance time period and the reappearance time interval.

8-2. The analysis method described in 8, in which in the inference step, the characteristic of the person is inferred on the basis of a relationship between the continuous appearance time period and the reappearance time interval.

8-3. The analysis method performed by the computer described in 8 or 8-2, the method further including: a count step of counting the number of times each characteristic which is inferred in correspondence with each person is inferred; and a reliability calculation step of calculating reliability of the inferred characteristic on the basis of the number of times each characteristic which is inferred in correspondence with a certain person is inferred.

8-4. The analysis method described in any one of 8 to 8-3, in which in the inference step, the characteristic of the person is inferred on the basis of correspondence information in which a pair of the continuous appearance time period and the reappearance time interval is associated with a characteristic.

8-5. The analysis method described in 8-4, in which in the inference step, the characteristic of the person is inferred on the basis of the correspondence information having different contents for each time slot during which the person appears.

8-6. The analysis method described in 8-4 or 8-5, in which in the inference step, the characteristic of the person is inferred on the basis of the continuous appearance time period, the reappearance time interval, a probability distribution, and the correspondence information.

8-7. The analysis method described in any one of 8 to 8-6, in which in the time calculation step, in a case in which a time t elapsed from the extraction of a first person from the video data to the next extraction of the first person from the video data is less than a predetermined time $t_s$, it is determined that the first person has been continuously present in the predetermined area for the elapsed time t, and in a case in which the elapsed time t is equal to or greater than the predetermined time $t_s$, it is determined that the first person has not been present in the predetermined area for the elapsed time t.

9. A program causing a computer to function as: a person extraction unit that analyzes video data to extract a person; a time calculation unit that calculates a continuous appearance time period for which the extracted person has been continuously present in a predetermined area and a reappearance time interval until the extracted person reappears in the predetermined area for each extracted person; and an inference unit that infers a characteristic of the extracted person on the basis of the continuous appearance time period and the reappearance time interval.

9-2. The program described in 9, in which the inference unit infers the characteristic of the person on the basis of a relationship between the continuous appearance time period and the reappearance time interval.

9-3. The program described in 9 or 9-2 causing the computer to further function as: a count unit that counts the number of times each characteristic which is inferred in correspondence with each person is inferred; and a reliability calculation unit that calculates reliability of the inferred characteristic on the basis of the number of times each characteristic which is inferred in correspondence with a certain person is inferred.

9-4. The program described in any one of 9 to 9-3, in which the inference unit infers the characteristic of the person on the basis of correspondence information in which a pair of the continuous appearance time period and the reappearance time interval is associated with a characteristic.

9-5. The program described in 9-4, in which the inference unit infers the characteristic of the person on the basis of the correspondence information having different contents for each time slot during which the person appears.

9-6. The program described in 9-4 or 9-5, in which the inference unit infers the characteristic of the person on the basis of the continuous appearance time period, the reappearance time interval, a probability distribution, and the correspondence information.

9-7. The program described in any one of 9 to 9-6, in which, in a case in which a time t elapsed from the extraction of a first person from the video data to the next extraction of the first person from the video data is less than a predetermined time $t_s$, the time calculation unit determines that the first person has been continuously present in the predetermined area for the elapsed time t, and in a case in which the elapsed time t is equal to or greater than the predetermined time $t_s$, the time calculation unit determines that the first person has not been present in the predetermined area for the elapsed time t.

It is apparent that the present invention is not limited to the above exemplary embodiment, and may be modified and changed without departing from the scope and spirit of the invention.

This application claims priority based on Japanese Patent Application No. 2016-067538 filed on Mar. 30, 2016, the disclosure of which is incorporated herein in its entirety.

What is claimed is:

1. An analysis apparatus comprising
a processor configured to:
analyze video data to extract a person;
calculate a time period for which the extracted person has been continuously present in a predetermined area and a time interval between first point in time when the extracted person disappears from the predetermined area and second point in time when the extracted person reappears to the predetermined area; and
infer a characteristic of the extracted person on the basis of the time period and the time interval, wherein
the time period is a time period in which the extracted person has been continuously present in a predetermined area in which a plurality of cameras are installed,
the time interval is a time period between when the extracted person disappears from the predetermined area and when the extracted person reappears in the predetermined area,
in a case where an elapsed time between a first point in time when a certain person is detected in a capturing range of any of the plurality of cameras and a second point in time when the person is detected in a capturing range of any of the plurality of cameras is less than a reference value, the processor is to determine that the person has been continuously present in the predetermined area between the first point in time and the second point in time, and
in a case in which the elapsed time is equal to or greater than the reference value, the elapsed time is defined as the time interval between when the person disappears from the predetermined area and when the person reappears in the predetermined area.

2. The analysis apparatus according to claim 1,
wherein the processor is configured to infer the characteristic of the person on the basis of a relationship between the time period and the time interval.

3. The analysis apparatus according to claim 1,
wherein the processor is configured to:
count the number of times each characteristic is inferred, the characteristic being inferred in correspondence with each person; and
calculate reliability of the inferred characteristic on the basis of the number of times each characteristic is inferred, the characteristic being inferred in correspondence with a certain person.

4. The analysis apparatus according to claim 1,
wherein the processor is configured to infer the characteristic of the person on the basis of correspondence information in which a pair of the time period and the time interval is associated with a characteristic.

5. The analysis apparatus according to claim 4,
wherein the processor is configured to infer the characteristic of the person on the basis of the correspondence information having different contents for each time slot during which the person appears.

6. The analysis apparatus according to claim 4,
wherein the processor is configured to infer the characteristic of the person on the basis of the time period, the time interval, a probability distribution, and the correspondence information.

7. The analysis apparatus according to claim 1,
wherein the processor is configured to:
in a case in which a time t elapsed from the extraction of a first person from the video data to the next extraction of the first person from the video data is less than a predetermined time $t_s$, determine that the first person has been continuously present in the predetermined area for the elapsed time t, and
in a case in which the elapsed time t is equal to or greater than the predetermined time $t_s$, determine that the first person has not been present in the predetermined area for the elapsed time t.

8. An analysis method performed by a computer, the method comprising:
analyzing video data to extract a person;
calculating a time period for which the extracted person has been continuously present in a predetermined area and a time interval between first point in time when the extracted person disappears from the predetermined area and second point in time when the extracted person reappears to the predetermined area; and
inferring a characteristic of the extracted person on the basis of the time period and the time interval, wherein
the time period is a time period in which the extracted person has been continuously present in a predetermined area in which a plurality of cameras are installed,
the time interval is a time period between when the extracted person disappears from the predetermined area and when the extracted person reappears in the predetermined area,
in a case where an elapsed time between a first point in time when a certain person is detected in a capturing range of any of the plurality of cameras and a second point in time when the person is detected in a capturing range of any of the plurality of cameras is less than a reference value, the person is determined as having been continuously present in the predetermined area between the first point in time and the second point in time, and
in a case in which the elapsed time is equal to or greater than the reference value, the elapsed time is defined as the time interval between when the person disappears from the predetermined area and when the person reappears in the predetermined area.

9. A non-transitory storage medium storing a program that causes a computer to:
   analyze video data to extract a person;
   calculate a time period for which the extracted person has been continuously present in a predetermined area and a time interval between first point in time when the extracted person disappears from the predetermined area and second point in time when the extracted person reappears to the predetermined area; and
   infer a characteristic of the extracted person on the basis of the time period and the time interval, wherein
   the time period is a time period in which the extracted person has been continuously present in a predetermined area in which a plurality of cameras are installed,
   the time interval is a time period between when the extracted person disappears from the predetermined area and when the extracted person reappears in the predetermined area,
   in a case where an elapsed time between a first point in time when a certain person is detected in a capturing range of any of the plurality of cameras and a second point in time when the person is detected in a capturing range of any of the plurality of cameras is less than a reference value, the person is determined as having been continuously present in the predetermined area between the first point in time and the second point in time, and
   in a case in which the elapsed time is equal to or greater than the reference value, the elapsed time is defined as the time interval between when the person disappears from the predetermined area and when the person reappears in the predetermined area.

* * * * *